US011866155B2

United States Patent
Schlipf et al.

(10) Patent No.: US 11,866,155 B2
(45) Date of Patent: Jan. 9, 2024

(54) ACTUATOR ARRANGEMENT FOR A FIXED LEADING EDGE MEMBER OF AN AIRCRAFT, WING ASSEMBLY AND AIRCRAFT EQUIPPED WITH SAID ACTUATOR ARRANGEMENT

(71) Applicant: Airbus Operations GmbH, Hamburg (DE)

(72) Inventors: Bernhard Schlipf, Bremen (DE); Norbert Geyer, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 9 days.

(21) Appl. No.: 17/615,069

(22) PCT Filed: Sep. 14, 2020

(86) PCT No.: PCT/EP2020/075643
§ 371 (c)(1),
(2) Date: Nov. 29, 2021

(87) PCT Pub. No.: WO2021/052908
PCT Pub. Date: Mar. 25, 2021

(65) Prior Publication Data
US 2022/0219808 A1    Jul. 14, 2022

(30) Foreign Application Priority Data
Sep. 17, 2019   (DE) .......................... 102019124987.2

(51) Int. Cl.
*B64C 13/34*     (2006.01)
*B64C 9/24*      (2006.01)
*B64C 13/38*     (2006.01)

(52) U.S. Cl.
CPC ................ *B64C 13/34* (2013.01); *B64C 9/24* (2013.01); *B64C 13/38* (2013.01)

(58) Field of Classification Search
CPC ......... B64C 13/34; B64C 13/38; B64C 13/28; B64C 9/24
See application file for complete search history.

(56) References Cited

U.S. PATENT DOCUMENTS 3,128,966 A    4/1964   Alvarez-Calderon
3,617,018 A *  11/1971  Baetke ................ B64C 9/26
                                              244/214

(Continued)

FOREIGN PATENT DOCUMENTS

EP    1338506 A1    8/2003
EP    3272649 A1    1/2018

(Continued)

OTHER PUBLICATIONS

International Search Report; priority document, Pub date Dec. 14, 2020.
German Search Report; priority document, Pub date May 18, 2020.

*Primary Examiner* — Rodney A Bonnette
(74) *Attorney, Agent, or Firm* — Greer, Burns & Crain, Ltd.

(57) ABSTRACT

An actuator arrangement for a fixed leading edge member of an aircraft wing. The fixed leading edge member has an inner cavity defined by the outer skin and ribs. The actuator arrangement comprises at least one geared rotary actuator which moves relative to the other parts along a circular arc section during extending and retracting of the high-lift device between a fully retracted position and a fully extended position. In the fully retracted position, the actuator is predominantly accommodated within the inner cavity and in the extended position the actuator is predominantly positioned outside the inner cavity, preferably protruding through a D-nose cut-out.

16 Claims, 13 Drawing Sheets

(56) References Cited

U.S. PATENT DOCUMENTS

| | | | |
|---|---|---|---|
| 3,640,150 | A | 2/1972 | Leiner et al. |
| 4,979,700 | A | 12/1990 | Tiiedeman et al. |
| 10,633,080 | B2 | 4/2020 | Huynh et al. |
| 2003/0080246 | A1 | 5/2003 | Koizumi et al. |
| 2012/0080557 | A1* | 4/2012 | Rodrigues ............... B64C 13/30 244/99.3 |
| 2014/0246540 | A1* | 9/2014 | Schlipf .................... B64C 3/50 244/99.3 |
| 2017/0305533 | A1 | 10/2017 | Viennot et al. |
| 2018/0015999 | A1 | 1/2018 | Van De Veire et al. |
| 2018/0273161 | A1 | 9/2018 | Schlipf et al. |
| 2018/0281927 | A1* | 10/2018 | Schlipf .................... B64C 9/22 |
| 2019/0193837 | A1* | 6/2019 | Schlipf .................. B64C 13/28 |
| 2022/0306278 | A1* | 9/2022 | Daandels ................. B64C 9/02 |

FOREIGN PATENT DOCUMENTS

| | | | |
|---|---|---|---|
| EP | 3378760 | A1 | 9/2018 |
| EP | 3378762 | A1 | 9/2018 |
| WO | 2010119280 | A1 | 10/2010 |

* cited by examiner

ACTUATOR ARRANGEMENT FOR A FIXED LEADING EDGE MEMBER OF AN AIRCRAFT, WING ASSEMBLY AND AIRCRAFT EQUIPPED WITH SAID ACTUATOR ARRANGEMENT

CROSS-REFERENCES TO RELATED APPLICATIONS

This application claims the benefit of the International Application No. PCT/EP2020/075643, filed on Sep. 14, 2020, and of the German patent application No. 102019124987.2 filed on Sep. 17, 2019, the entire disclosures of which are incorporated herein by way of reference.

FIELD OF THE INVENTION

The invention relates to an actuator arrangement for a fixed leading edge member of an aircraft. Furthermore, the invention relates to a wing assembly and an aircraft equipped with such an actuator arrangement.

BACKGROUND OF THE INVENTION

Most known slat actuation architectures have a static geared rotary actuator (GRA) that drives the slat via a pinon. For some applications, like, e.g., droop nose or for space allocation (e.g., short curved track principle) lever bearing assemblies are preferred.

U.S. Pat. No. 4,979,700 A discloses a typical GRA for a leading edge of an aircraft.

SUMMARY OF THE INVENTION

It is an object of the invention to improve an actuator arrangement for high-lift devices.

The invention provides an actuator arrangement for a fixed leading edge member, the fixed leading edge member having an inner cavity at least in part defined by an outer skin and a rib, the actuator arrangement being configured for extending and retracting at least one high-lift device attached to the fixed leading edge member, the actuator arrangement comprising:
- a fixed leading edge lever configured for being attached to the fixed leading edge member,
- a high-lift device lever configured for being attached to the high-lift device, and
- an actuator assembly that is configured for driving the fixed leading edge lever and the high-lift device lever relative to each other, the actuator assembly including at least one actuator, preferably a geared rotary actuator, wherein the actuator assembly is configured such that, when the fixed leading edge lever and the high-lift device lever are attached to the high-lift device and the fixed leading edge member, respectively, the actuator is movable during extending and retracting of the high-lift device between a fully retracted position, in which the actuator is predominantly accommodated within the inner cavity, and a fully extended position, in which the actuator is predominantly positioned outside the inner cavity.

Preferably, the actuator is movable along a circular arc section in a forward direction during extending of the high-lift device and/or in an aft direction during retracting of the high-lift device.

Preferably, the actuator is rotatable about a rotational axis that is defined by the mounting point of the fixed leading edge lever.

Preferably, the actuator, when in the fully retracted position, is wholly accommodated within the inner cavity.

Preferably, the actuator, when in the fully extended position, is wholly positioned outside the inner cavity.

Preferably, the actuator assembly includes at least two actuators and two actuators each are grouped together into a respective actuator group for driving one high-lift device.

Preferably, the actuator arrangement further comprises a drive unit providing mechanical power for driving the actuator assembly Preferably, the actuator assembly includes a spanwise drive train having at least one spanwise straight drive shaft, which mechanically couples two adjacent actuators.

Preferably, the actuator assembly includes a first actuator and a second actuator, wherein the first actuator is mechanically coupled to the drive unit.

Preferably, the first actuator is mechanically coupled to the drive unit via a pivotable drive shaft.

Preferably, the second actuator is mechanically coupled to the first actuator via a spanwise straight drive shaft.

Preferably, the drive unit is arranged spanwise between adjacent actuators associated with one high-lift device Preferably, the drive unit is arranged on the same axis as the actuator in a spanwise direction.

Preferably, the drive unit is arranged aft of the actuator.

Preferably, the drive unit is arranged below the actuator.

Preferably, the drive unit is arranged aft and below of the actuator.

Preferably, the drive unit is arranged adjacent to the actuator in a spanwise direction or chordwise direction.

Preferably, the drive unit is configured to be arranged predominantly, in particular entirely, within an upper half of the inner cavity in the fully retracted position.

Preferably, the drive unit is configured to be arranged partially, in particular predominantly, within a lower half of the inner cavity in the fully extended position.

Preferably, the drive unit is configured to be arranged within the inner cavity, when in the fully retracted position, in the fully extended position and when moving between said positions.

Preferably, the drive unit is configured to be arranged predominantly, in particular entirely, within a lower half of the inner cavity in the fully retracted position.

Preferably, the drive unit is configured to be arranged partially outside inner cavity in the fully extended position.

Preferably, the drive unit is configured to be arranged to protrude downward through a cut-out of the fixed leading edge member.

Preferably, the drive unit is attached to the actuator assembly, so as to be simultaneously movable.

Preferably, the drive unit has at least one motor for driving the actuator.

Preferably, the drive unit has at least one electric motor for driving the actuator.

Preferably, the drive unit has at least one hydraulic motor for driving the actuator.

Preferably, one or each motor is mechanically coupled to two adjacent actuators associated with one high-lift device, in particular via a spanwise straight drive shaft.

Preferably, one or each motor is arranged aft of and adjacent to the actuator when viewed in a top view.

Preferably, one or each motor is arranged aft of and below the actuator and adjacent to the actuator when viewed in a top view.

Preferably, one or each motor is arranged on the same axis as the actuator in a spanwise direction.

The invention provides a wing assembly for an aircraft, the wing assembly comprising a fixed leading edge member, a high-lift device movably attached to the fixed leading edge member, and a preferred actuator arrangement, wherein the fixed leading edge lever is attached to the fixed leading edge and the high-lift device lever is attached to the high-lift device, so as to allow movement of the high-lift device between a retraced position and a fully extended position.

The invention provides an aircraft comprising a preferred wing assembly.

The preferred configurations allow for a GRA to be integrated into the lever architecture. The stroke of the GRA may be maximized using the preferred configurations, thereby increasing efficiency. This may be achieved due to a reduction of the required forces by increasing travel, thus reducing actuation momentum. As a result, gear sizes within the GRA and the overall size of the GRA may be reduced. Consequently, weight and space efficiency are improved.

BRIEF DESCRIPTION OF THE DRAWINGS

Embodiments of the invention are described in more detail with reference to the accompanying schematic drawings.

DETAILED DESCRIPTION OF THE PREFERRED EMBODIMENTS

Figure 1:
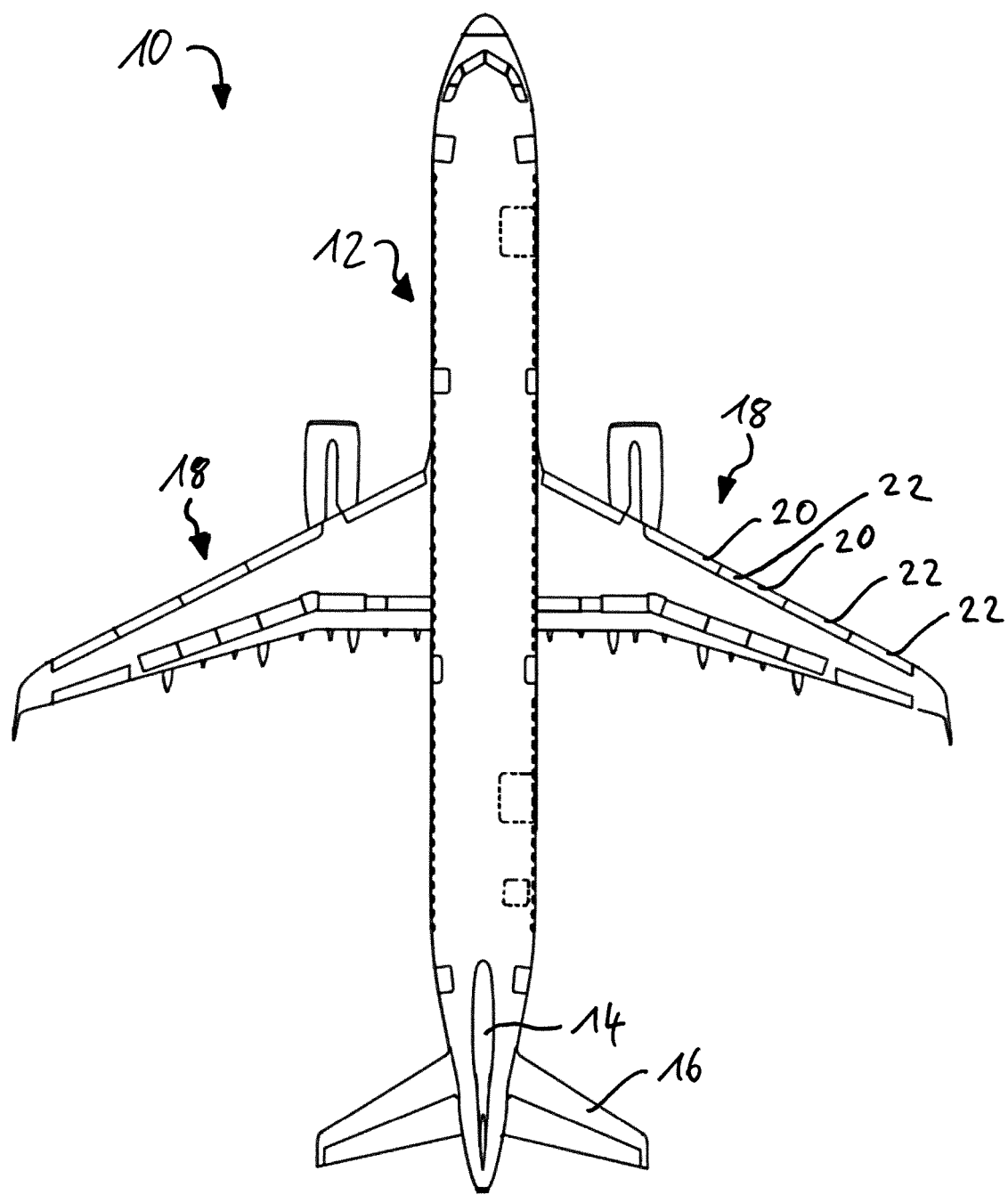
FIG. 1 depicts an embodiment of an aircraft.

Referring to FIG. 1, an embodiment of an aircraft 10 is depicted. In a known manner, the aircraft 10 comprises a fuselage 12, a vertical tail plane 14 and a horizontal tail plane 16. Furthermore, the aircraft 10 comprises a wing assembly 18, which comprises at least one high-lift device 20, such as a slat 22.

Figure 4:
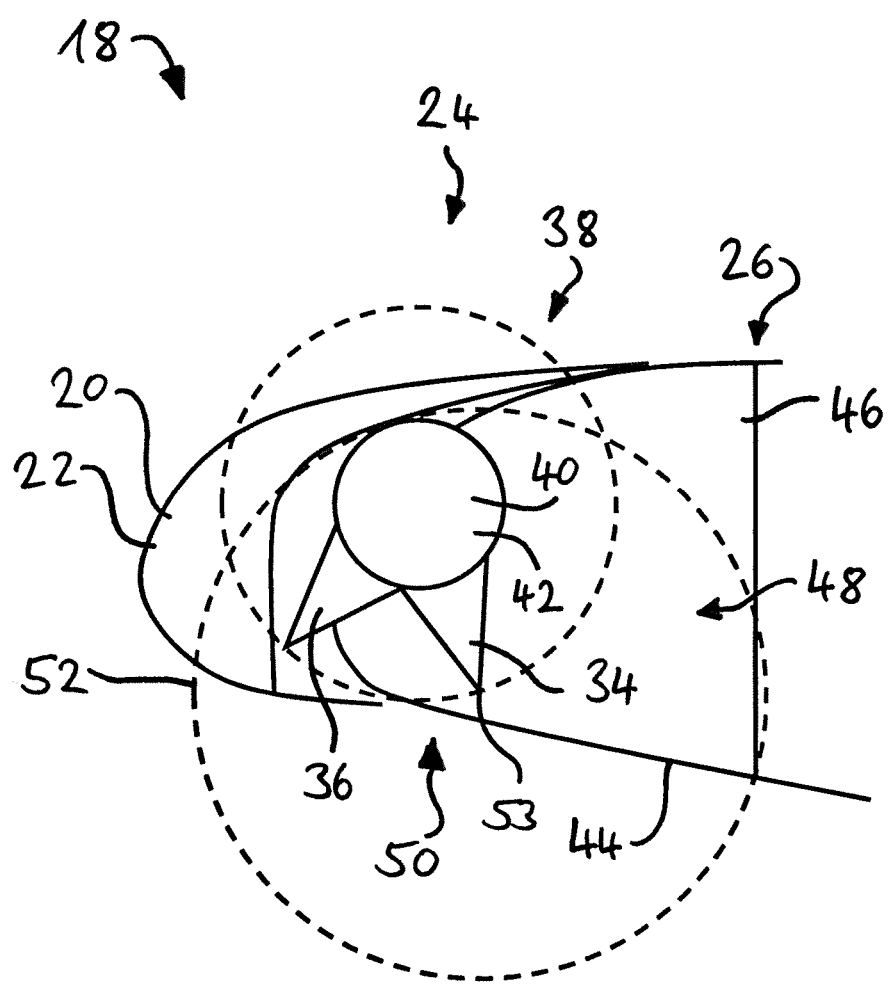
FIG. 4 depicts a cross-section of the actuator arrangement of FIG. 2 in the fully retracted position.
Figure 5:
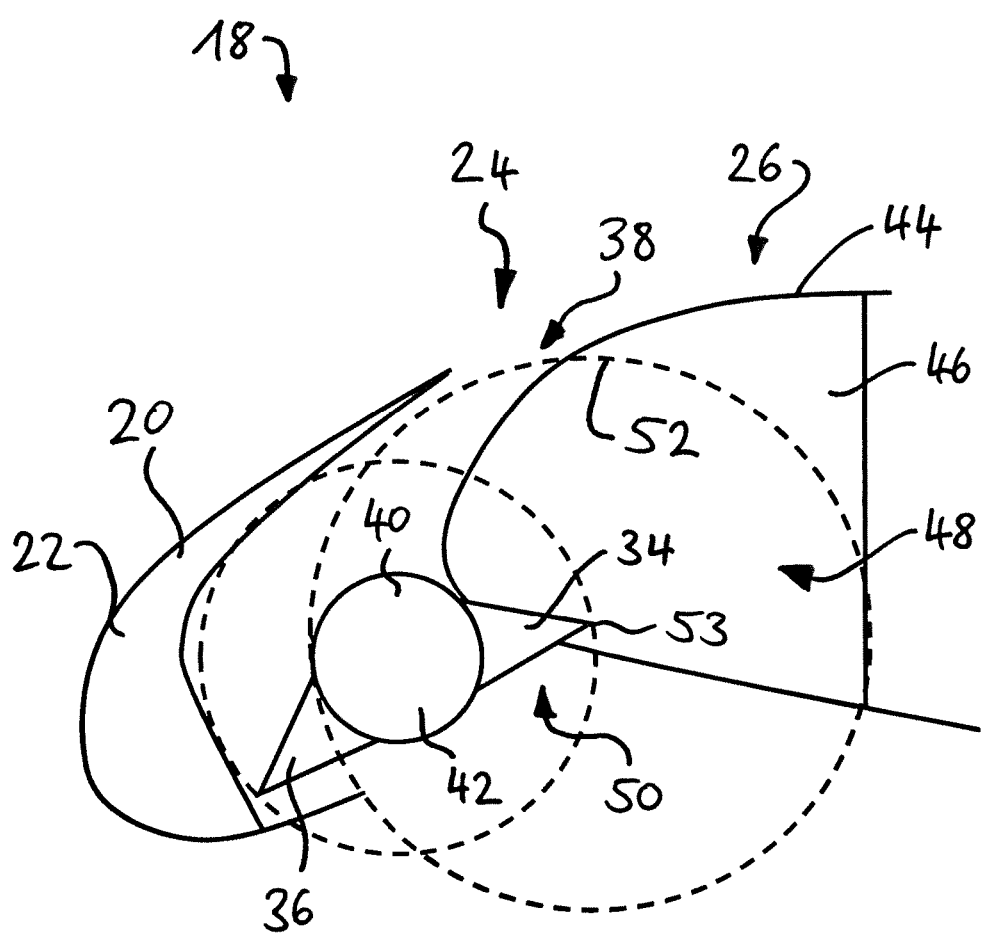
FIG. 5 depicts a cross-section of the actuator arrangement of FIG. 2 in the fully extended position.

Referring now to FIGS. 2 to 5, an actuator arrangement 24 is configured to move the high-lift device 20 between a fully retracted position (FIG. 4) and a fully extended position (FIG. 5).

Figure 2:
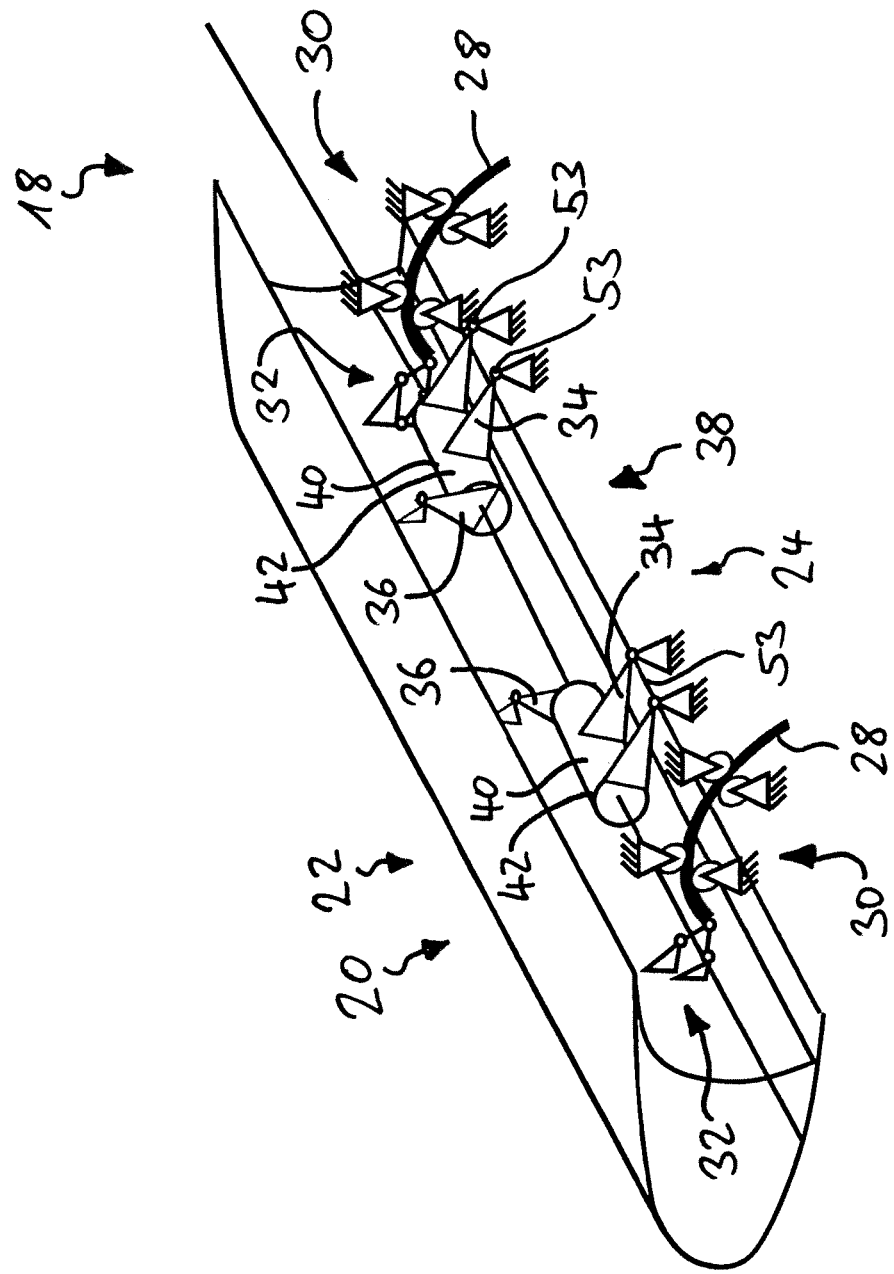
FIG. 2 depicts an embodiment of an actuator arrangement.
Figure 3:
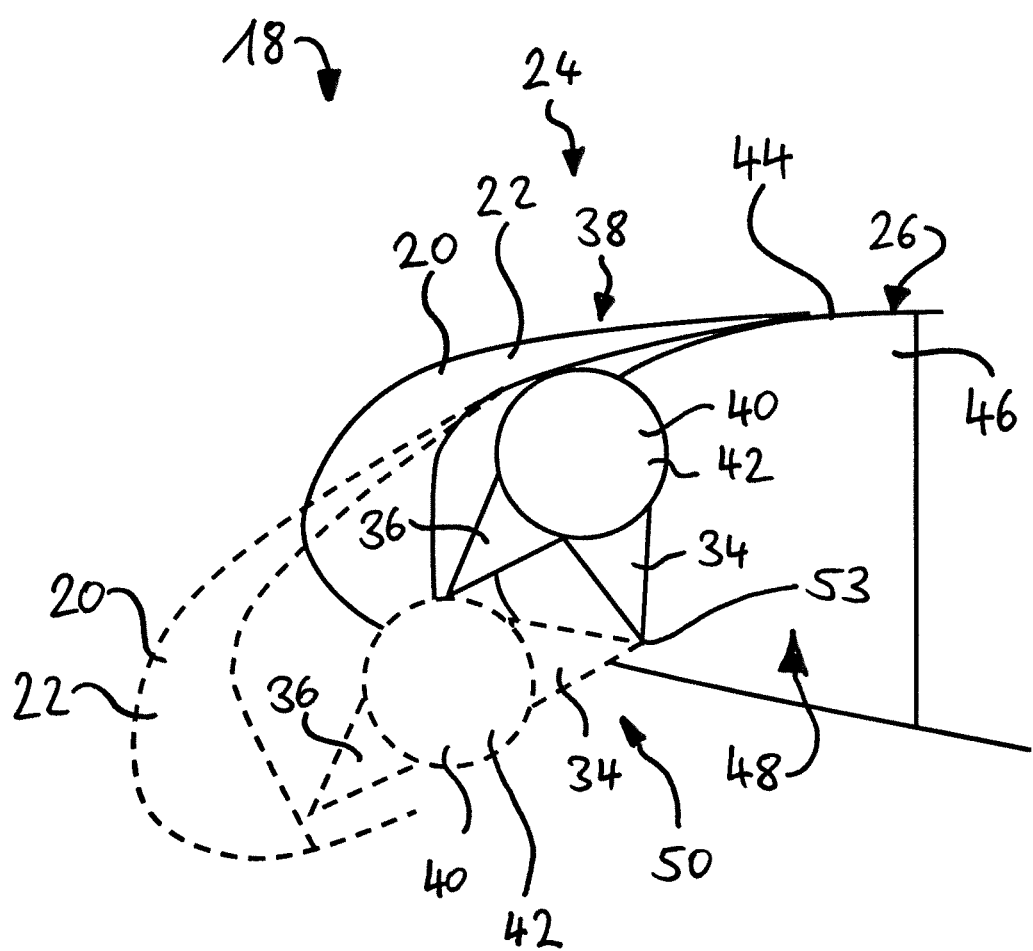
FIG. 3 depicts a cross-section of the actuator arrangement of FIG. 2 in the fully retracted and extended positions.

As depicted more closely in FIG. 2, the high-lift device 20 is movably attached to a fixed leading edge member 26 (FIG. 3) using a plurality of rails 28, which are supported by roller bearings 30. The rails 28 are attached to the high-lift device 20 via a lever assembly 32.

In the present embodiment, the actuator arrangement 24 comprises two fixed leading edge levers 34. The fixed leading edge lever 34 is mechanically coupled to the fixed leading edge member 26.

Furthermore, the actuator arrangement 24 comprises a high-lift device lever 36. The high-lift device lever 36 is coupled to the high-lift device 20.

Furthermore, the actuator arrangement 24 comprises an actuator assembly 38. The actuator assembly 38 is configured for driving the fixed leading edge lever 34 and the high-lift device lever 36 relative to each other, so as to extend and retract the high-lift device 20.

The actuator assembly 38 comprises at least one actuator 40. The actuator 40 is preferably a geared rotary actuator 42.

The fixed leading edge member 26 comprises, in manner known per se, an outer skin 44 and a plurality of ribs 46, which support the outer skin 44. Adjacent ribs 46 and the outer skin 44 define an inner cavity 48 of the fixed leading edge member 26.

Furthermore, the outer skin 44 comprises so-called D-nose cut-outs 50, which allow extending and retracting the high-lift device 20 via the actuator arrangement 24 and the rails 28.

In this embodiment, the actuator 40 is arranged predominately inside the inner cavity 48, when in the fully retracted position (FIG. 4). Furthermore, the actuator 40 is arranged predominately in an upper half of the inner cavity 48, when in the fully retracted position.

In order to extend the high-lift device 20 the actuator arrangement 24 is operated. In doing so, the actuator 40 moves the fixed leading edge lever 34 relative to the high-lift device lever 36.

As indicated in FIGS. 4 and 5, the fixed leading edge lever 34 and the high-lift device lever 36 stretch in the forward aft direction. In other words, the angle between the fixed leading edge lever 34 and the high-lift device lever 36 is acute at the beginning and increases to be more than 90 degrees in the extended position (FIG. 5). During the movement of the high-lift device 20, the actuator 40 itself follows the movement along a circular arc section 52 until the actuator 40 is arranged entirely outside the inner cavity 48, when in the fully extended position. Thus, the actuator 40 preferably rotates about a rotational axis 53. The rotational axis 53 is defined by the mounting point of the fixed leading edge lever 34.

It should be noted that in the following further embodiments are only described in so far as they differ from the embodiment described above.

Figure 6:
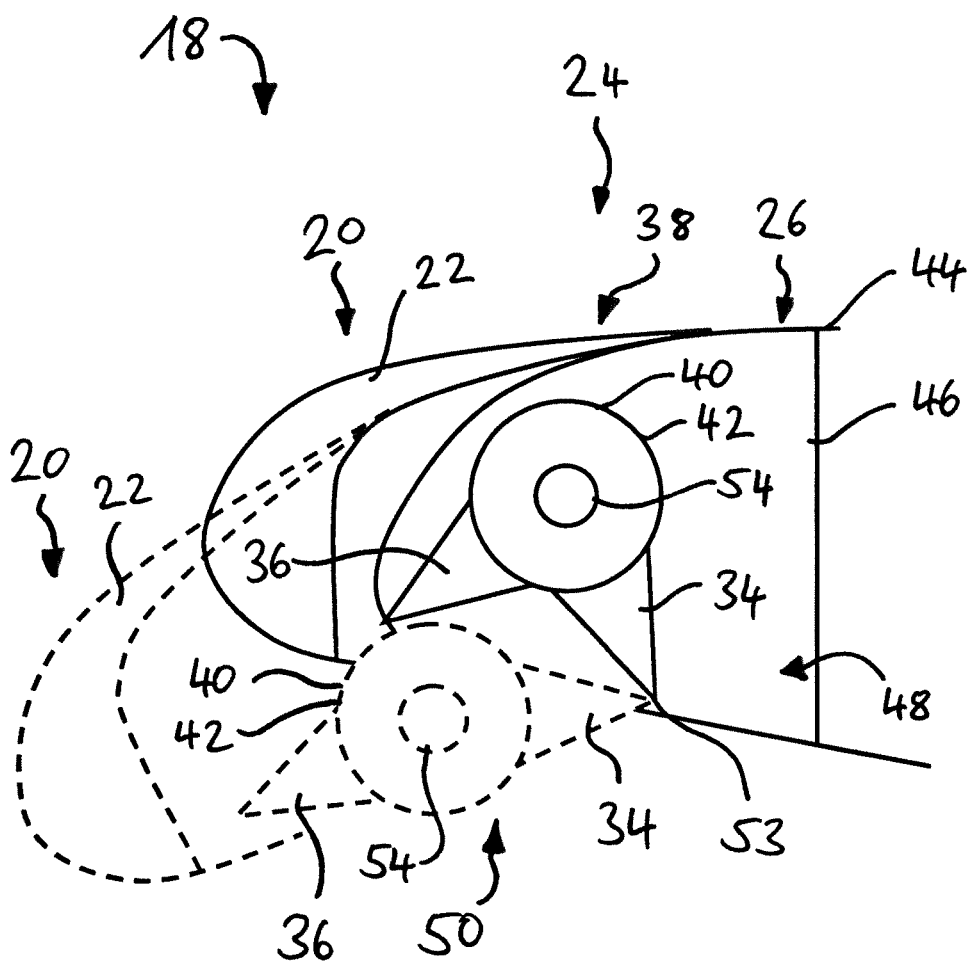
FIG. 6 depicts a cross-section of another embodiment of an actuator arrangement in the fully retracted and extended positions.
Figure 7:
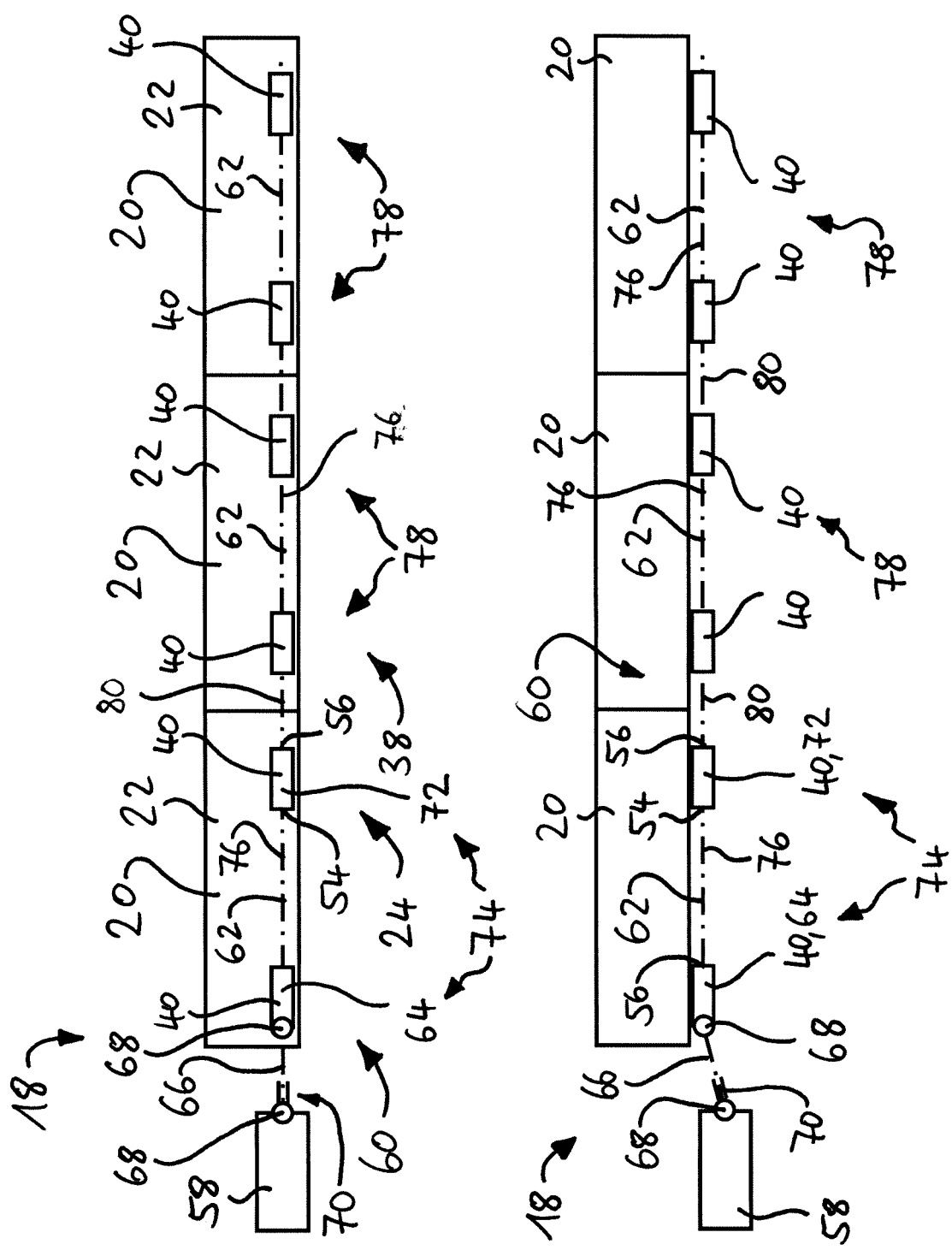
FIG. 7 depicts a top view of the actuator arrangement of FIG. 6 in the fully retracted (upper) and extended positions (lower)

Referring to FIGS. 6 and 7 the actuator arrangement 24 comprises a plurality of actuators 40. Each actuator 40 has an input shaft 54 and an output shaft 56.

Furthermore, the actuator arrangement 24 comprises a drive unit 58. The drive unit 58 may be hydraulic or electric in nature.

The actuator arrangement 24 comprises a drive train formed by a plurality of straight drive shafts 62, which are aligned substantially along the spanwise direction.

The drive unit 58 may be fixed in place and be connected to a first actuator 64 using an initial drive shaft 66 and universal joints 68. Splines 70 may be used to transfer the torque.

Furthermore, the actuator assembly 38 comprises a second actuator 72 which is associated with the same high-lift device 20 as the first actuator 64. The first actuator 64 and the second actuator 72 thereby form an actuator group 74, which is associated with the same high-lift device 20.

In this embodiment a connecting drive shaft 76 is mechanically coupled to the output shaft 56 of the first actuator 64 and to the input shaft 54 of the second actuator 72.

In the case of a plurality of high-lift devices 20, the output shaft 56 of the second actuator 72 is connected to a further actuator group 78 via a further drive shaft 80. As can be seen from FIG. 7, this pattern is repeated until all high-lift devices 20 and their respective actuator group 74 are mechanically connected to the drive unit 58.

As can be seen from FIG. 6, the actuator 40 is arranged in its entirety within the inner cavity 48, when in the fully retracted position, whereas the actuator 40 predominately protrudes outside the inner cavity 48 at the bottom in the fully extended position. The actuator 40 thus extends through one of the D-nose cut-outs 50.

Figure 8:
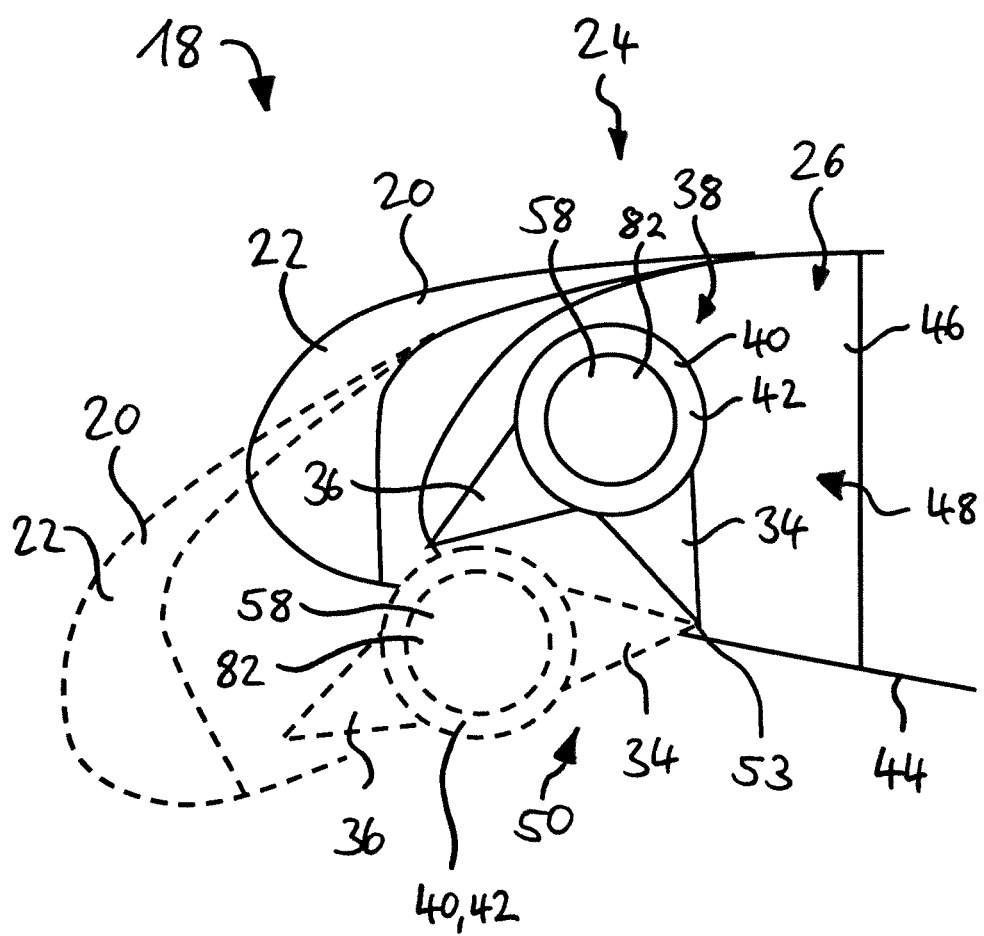
FIG. 8 depicts a cross-section of another embodiment of an actuator arrangement in the fully retracted and extended positions.
Figure 9:
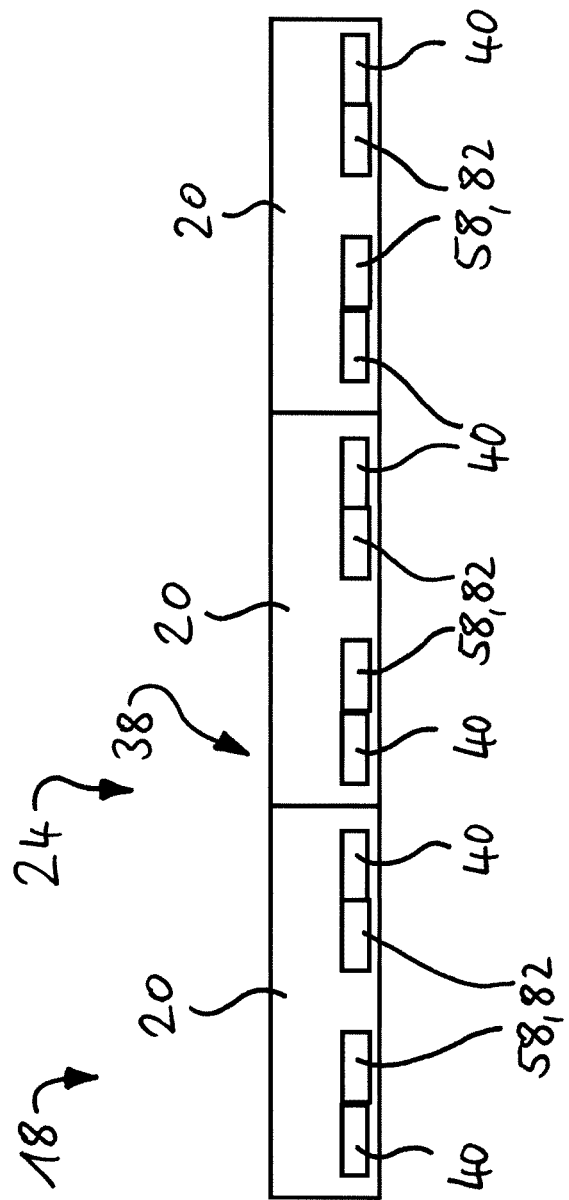
FIG. 9 depicts a top view of the actuator arrangement of FIG. 8 in the fully retracted position.

Referring now to FIGS. 8 and 9, the drive unit 58 comprises an electric motor 82. As can be seen from FIG. 9 in particular, each electric motor 82 is arranged on the axis defined by the actuator 40. Here, each actuator 40 has its own electric motor 82.

As illustrated in FIG. 8, the movement of the actuator or the actuator arrangement 24 is substantially the same as the movement in the previous embodiment.

Figure 10:
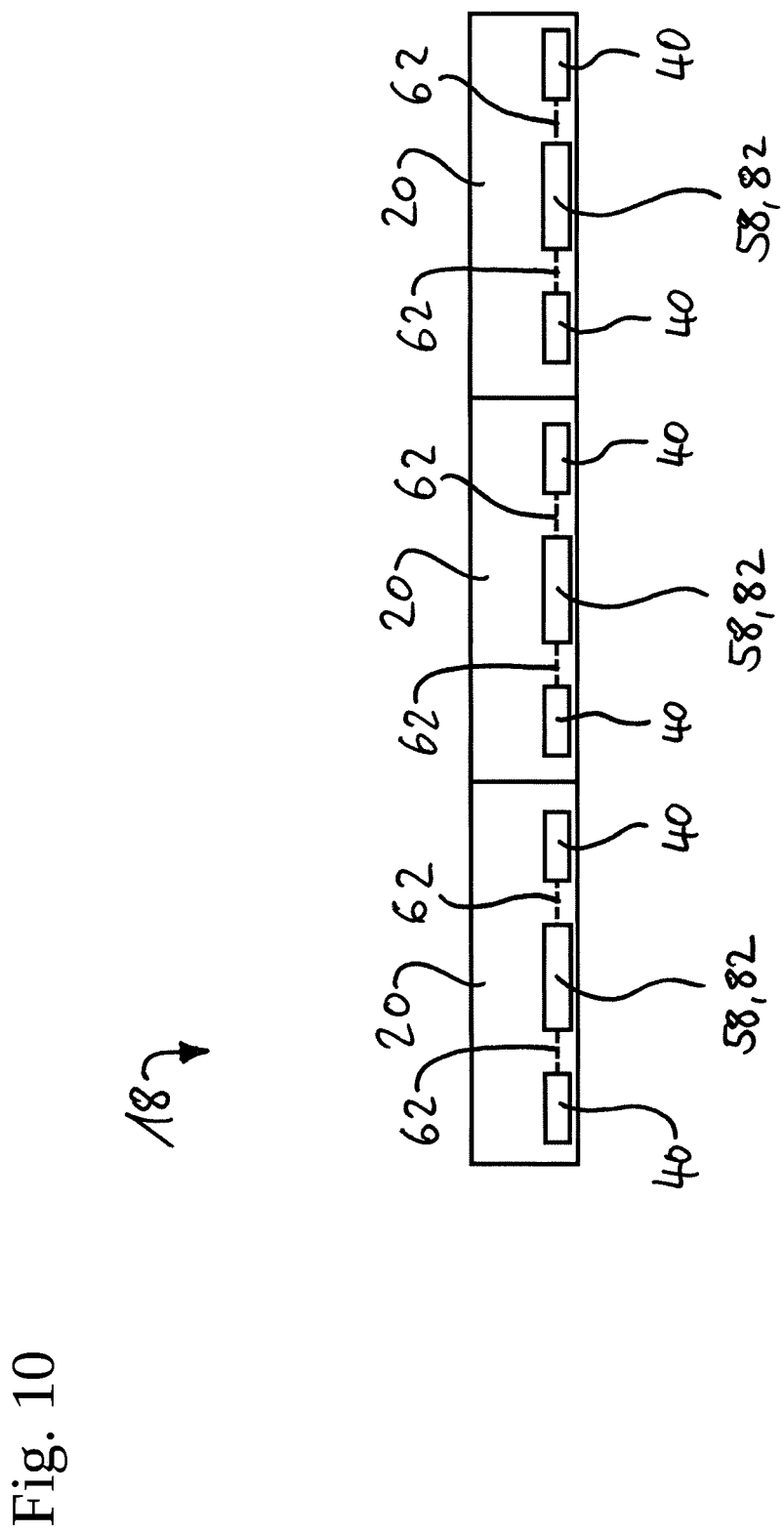
FIG. 10 depicts a variant of the actuator arrangement of FIG. 8.

Referring to FIG. 10, a variant of the previous actuator arrangement 24 (FIG. 8) is depicted. In this variant, an actuator group 74 are driven by a single electric motor 82, which is connected to the respective actuators 40 using a drive shaft 62.

Figure 11:
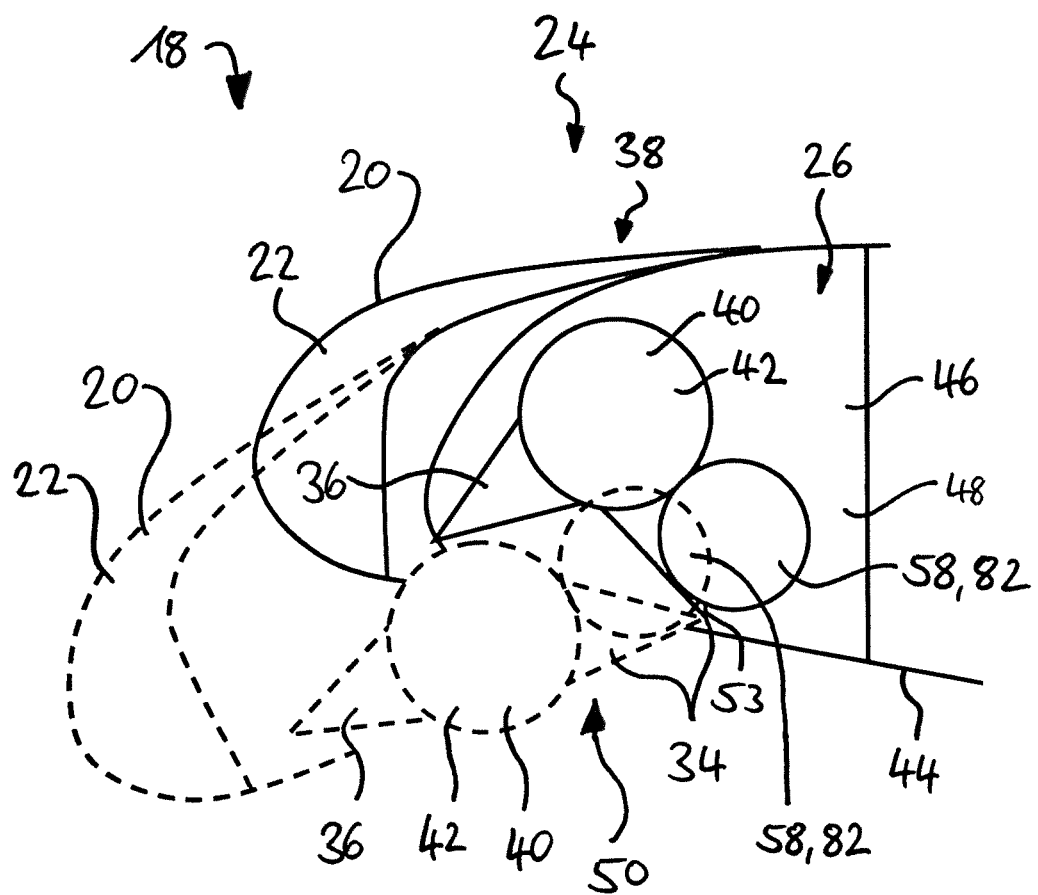
FIG. 11 depicts a cross-section of another embodiment of an actuator arrangement in the fully retracted and extended positions.

Referring now to FIG. 11, again each actuator 40 is driven by the drive unit 58 individually. As can be seen from FIG. 11, in the fully retracted position, the actuator 40 is arranged in its entirety within the inner cavity 48, as well as the drive unit 58.

In particular, the actuator 40 is arranged in an upper half of the inner cavity 48, whereas the drive unit 58 is arranged in a lower half of the inner cavity 48, when in the fully retracted position.

In the fully extended position, the actuator 40 is predominately protruding outside of the fixed leading edge member 26, whereas the drive unit 58 is still predominately accommodated within the inner cavity 48.

Figure 12:
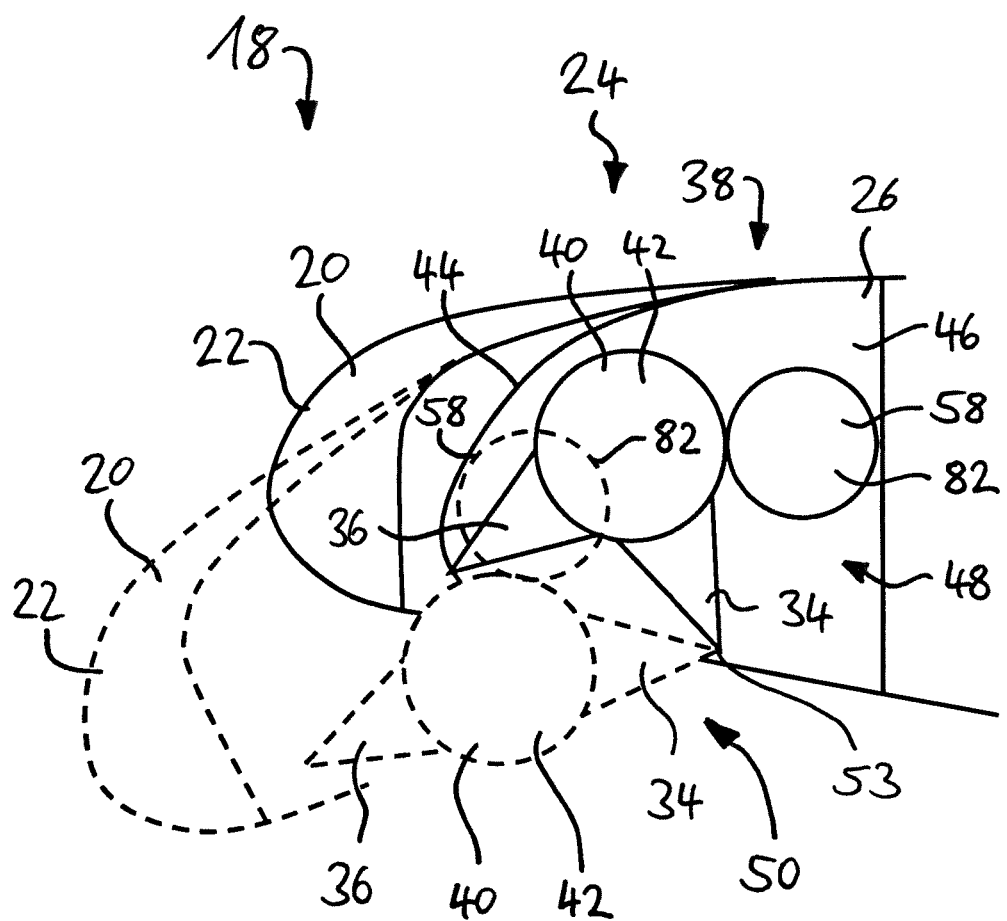
FIG. 12 depicts a variant of the actuator arrangement of FIG. 11.
Figure 13:
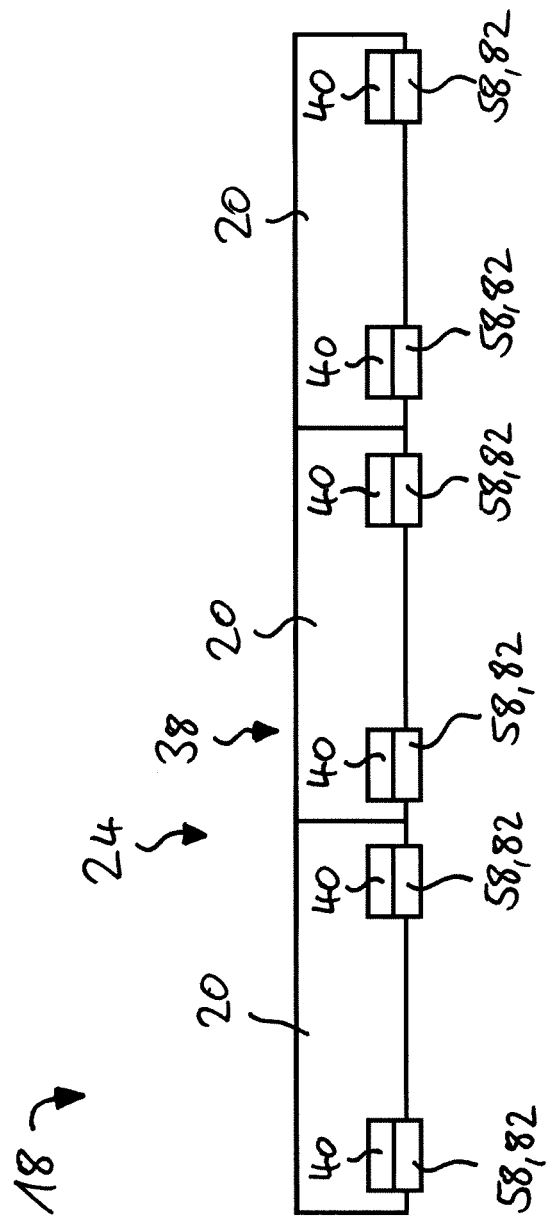
FIG. 13 depicts a top view of the actuator arrangement of FIG. 12 in the fully retracted position.

Similarly, in the variant depicted in FIG. 12, both the actuator 40 and the drive unit 58 are arranged in an upper half of the inner cavity 48 in the fully retracted position, whereas in the fully extended position, the actuator 40 protrudes outside the inner cavity 48 and the drive unit 58 is entirely accommodated within the inner cavity 48.

With the described configurations of the actuator arrangement 24 the actuators 40, such as geared rotary actuators 42, can be integrated more easily into the small space provided by fixed leading edge member 26 and the high-lift device 20.

In particular, the stroke of the actuator 40 may be maximized which allows an increase in efficiency due to a reduction of required forces for moving the high-lift device 20. Due to the lower requirements the overall size of actuators 40 may be reduced so that weight and space efficiency are improved. Furthermore, the size of the D-nose cut-out 50 may be reduced using a preferred actuator arrangement 24.

In order to improve space allocation, reduce weight and increase aerodynamic performance in high-lift devices (20), an actuator arrangement (24) for a fixed leading edge member (26) is proposed. The fixed leading edge member (26) has an inner cavity (48) defined by the outer skin (44) and ribs (46). The actuator arrangement (24) comprises at least one geared rotary actuator (42) which moves relative to the other parts along a circular arc section (52) during extending and retracting of the high-lift device (20) between a fully retracted position and a fully extended position. In the fully retracted position, the actuator (40) is predominantly accommodated within the inner cavity (48) and in the extended position the actuator (40) is predominantly positioned outside the inner cavity (48), preferably protruding through a D-nose cut-out (50).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 vertical tail plane
16 horizontal tail plane
18 wing assembly
20 high-lift device
22 slat
24 actuator arrangement
26 fixed leading edge member
28 rail
30 roller bearing
32 lever assembly
34 fixed leading edge member lever
36 high-lift device lever
38 actuator assembly
40 actuator
42 geared rotary actuator
44 outer skin
46 rib
48 inner cavity
50 D-nose cut-out
52 circular arc section
53 rotational axis
54 input shaft
56 output shaft
58 drive unit
60 drive train
62 drive shaft
64 first actuator
66 initial drive shaft 68 universal joint
70 spline
72 second actuator
74 actuator group
76 connecting shaft
78 further actuator group
80 further drive shaft
82 electric motor

The invention claimed is:

1. An actuator arrangement for a fixed leading edge member, the fixed leading edge member having an inner cavity at least in part defined by an outer skin and a rib, the actuator arrangement being configured for extending and retracting at least one high-lift device attached to the fixed leading edge member, the actuator arrangement comprising:
a fixed leading edge lever configured for being attached to the fixed leading edge member,
a high-lift device lever configured for being attached to the high-lift device, and
an actuator assembly configured to drive the fixed leading edge lever and the high-lift device lever relative to each other, the actuator assembly including at least one actuator,
wherein the actuator assembly is configured such that, when the fixed leading edge lever and the high-lift device lever are attached to the high-lift device and the fixed leading edge member, respectively, the actuator is movable during extending and retracting of the high-lift device between a fully retracted position, in which the actuator is predominantly accommodated within the inner cavity, and a fully extended position, in which the actuator is predominantly positioned outside the inner cavity.

2. The actuator arrangement according to claim 1, wherein the actuator is movable along a circular arc section in at least one of a forward direction during extending of the high-lift device or an aft direction during retracting of the high-lift device.

3. The actuator arrangement according to claim 1, wherein the actuator, when in the fully retracted position, is wholly accommodated within the inner cavity.

4. The actuator arrangement according to claim 1, wherein the actuator, when in the fully extended position, is wholly positioned outside the inner cavity.

5. The actuator arrangement according to claim 1, wherein the actuator assembly includes at least two actuators and two actuators each are grouped together into a respective actuator group for driving one high-lift device.

6. The actuator arrangement according to claim 1, further comprising a drive unit providing mechanical power for driving the actuator assembly,
wherein the actuator assembly includes a spanwise drive train having at least one spanwise straight drive shaft, which mechanically couples two adjacent actuators.

7. The actuator arrangement according to claim 6, wherein the actuator assembly includes a first actuator and a second actuator, wherein the first actuator is mechanically coupled to the drive unit.

8. The actuator arrangement according to claim 7, wherein the first actuator is mechanically coupled to the drive unit via a pivotable drive shaft.

9. The actuator arrangement according to claim 7, wherein the second actuator is mechanically coupled to the first actuator via a spanwise straight drive shaft.

10. The actuator arrangement according to claim 1, further comprising a drive unit providing mechanical power for driving the actuator assembly, wherein the drive unit is arranged spanwise between adjacent actuators associated with one high-lift device.

11. The actuator arrangement according to claim 1,
further comprising a drive unit providing mechanical power for driving the actuator assembly,
wherein the drive unit is arranged on the same axis as the actuator in a spanwise direction.

12. The actuator arrangement according to claim 1,
further comprising a drive unit providing mechanical power for driving the actuator assembly,
wherein the drive unit is arranged aft of the actuator.

13. The actuator arrangement according to claim 1,
further comprising a drive unit providing mechanical power for driving the actuator assembly,
wherein the drive unit is arranged adjacent to the actuator in a spanwise direction or chordwise direction.

14. The actuator arrangement according to claim 1,
further comprising a drive unit providing mechanical power for driving the actuator assembly,
wherein the drive unit is attached to the actuator assembly, to be simultaneously movable.

15. A wing assembly for an aircraft, the wing assembly comprising
a fixed leading edge member,
a high-lift device movably attached to the fixed leading edge member, and
an actuator arrangement according to claim 1,
wherein the fixed leading edge lever is attached to the fixed leading edge member and the high-lift device lever is attached to the high-lift device, so as to allow movement of the high-lift device between a fully retraced position and a fully extended position.

16. An aircraft comprising a wing assembly according to claim 15.

* * * * *